April 28, 1970　　　R. L. HORN　　　3,508,643
MAILABLE CONTAINER FOR SPECTACLES
Filed Feb. 7, 1969
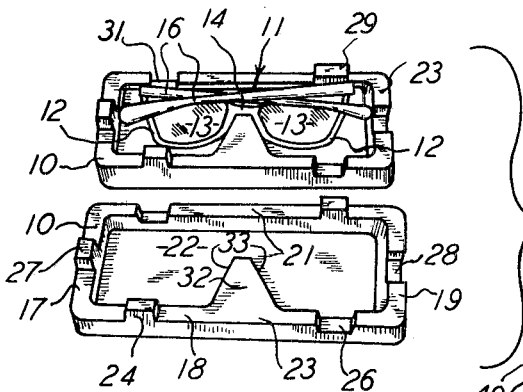
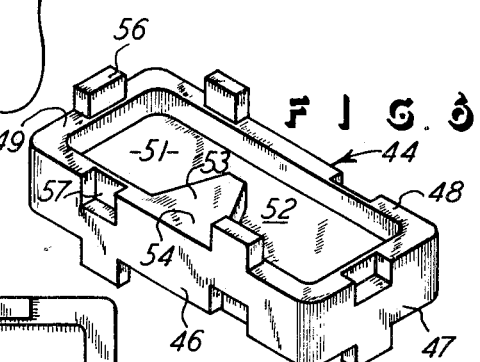
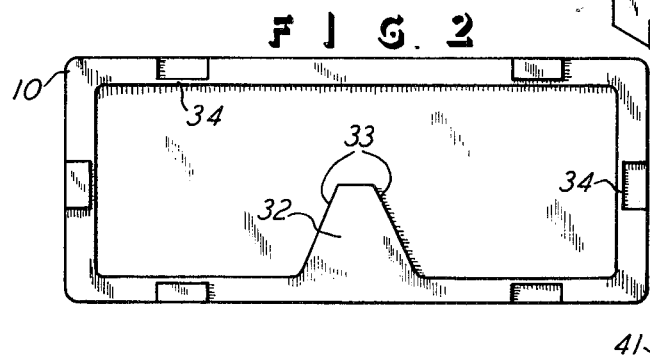
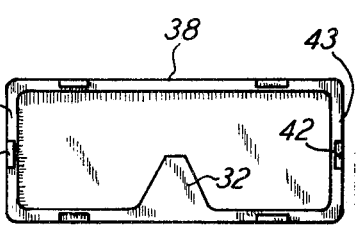
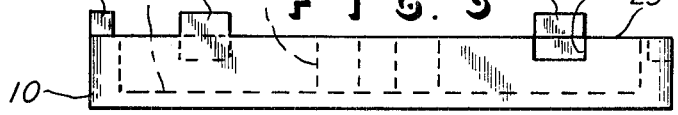
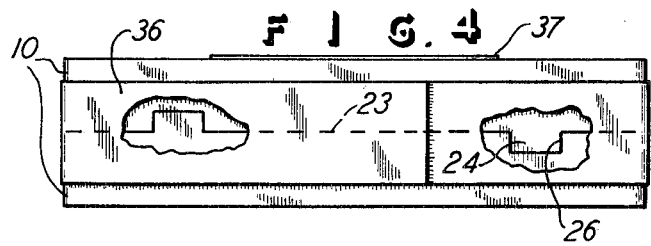
INVENTOR:
RICHARD L. HORN
Arthur J. Hansmann
ATTORNEY 3,508,643
MAILABLE CONTAINER FOR SPECTACLES
Richard L. Horn, Bethel Park, Pa., assignor to Medical Contact Lens Service, Inc., Milwaukee, Wis., a corporation of Wisconsin
Filed Feb. 7, 1969, Ser. No. 797,397
Int. Cl. A45c 11/04; B65d 7/00
U.S. Cl. 206—5      7 Claims

ABSTRACT OF THE DISCLOSURE

A mailable container for spectacles wherein two identical halves form the container in a box shape and present a hollow interior for the reception of a person's optical spectacles which include the frames and corrective lenses. These identical halves contain tongues and grooves alternately arranged along the sides of the halves to be mated together when the halves are brought into a closed position surrounding the enclosed spectacles. A nose piece is provided in the halves for restraining movement of the spectacles and for reinforcing the halves through the center portion thereof and resisting crushing of the container. Also, an insert piece may be used between the halves to provide two compartments for separating and containing two pairs of spectacles and thereby provide a multiple mailer.

This invention relates to a mailable container for spectacles.

BACKGROUND OF THE INVENTION

It is common practice for an ophthalmology supplier and manufacturer to send optical spectacles through the mail. Such mailings are commonly made to the optometrist or oculist who has prescribed and ordered the spectacles from the manufacturer. Such mailings commonly have the spectacles include the corrective lenses already in the spectacle frames, and it is therefore important that the mailing package be sturdy to prevent damage to the spectacles. Also, it is important that the spectacles do not slide within the container and scratch either the frames or the lenses, especially where the lenses are made of plastic and are more susceptible to scratching than are glass lenses. Still further, it is important that the container be light weight so that it is easily handled in the mail without requiring excessive postage, and it is important that the container be capable of receiving spectacle frames of all sizes though only one size of container is utilized.

Still further, it is significant that the container be easily manufactured, inexpensive in manufacture, be easy to assemble for securing the spectacles therein and also be easy to open for removal of the spectacles, and the container is made in two identical halves so that only one mold is required when the container is made of a Styrofoam type of plastic, and the two halves are arranged so that they cannot be assembled in the wrong way but can only be readily assembled correctly.

The present invention recognizes the aforementioned history and facts pertaining to the art, and it is the purpose of the present invention to provide a solution to the problems and concerns of the art, including the concerns mentioned in the aforegoing.

BRIEF DESCRIPTION OF THE DRAWING

FIG. 1 is a perspective view of the two halves forming this container, and showing the spectacles in one half.

FIG. 2 is a plan view of the interior of the halves, but with tongues and grooves being slightly different from those shown in FIG. 1.

FIG. 3 is a side elevational view of FIG. 2.

FIG. 4 is a side elevational view of FIG. 2 but with the mating half added thereto and with a sealing strip shown wrapped around the container and a mailing label applied on top.

FIG. 5 is a plan view similar to FIG. 2 but with the tongues and grooves in the opposite arrangement from that shown in FIG. 2.

FIG. 6 is a perspective view of an insert which can be used between the two halves to form a multiple mailer and which is useful with the halves of the type shown in FIG. 5.

DETAILED DESCRIPTION OF THE PREFERRED EMBODIMENTS

FIG. 1 shows one form of this container, and it will be seen that the container consists of two identical halves 10, and these halves are preferably formed of a type of plastic material commonly known as Styrofoam which is an expanded polystyrene material. This type of material is sturdy and light weight and therefore has the necessary attributes for a mailing container of this type.

The half 10 in FIG. 1 is shown to contain optical spectacles 11 which are positioned therein and ready for mailing when the mating container half shown in the lower portion of FIG. 1 is placed over the spectacles 11, such as the two halves 10 are in FIG. 4. The spectacles 11 are of a conventional structure, and they include the two eye pieces 12 containing the corrective lenses 13. The lenses 13 may be of either a glass or plastic material. The spectacles 11 also include the usual nose bridge 14 and the two temple pieces 16 which are respectively pivotally attached to the eye pieces 12, and therefore the spectacles 11 are shown in the pivotally folded position.

The container halves 10 are identical in all respects, and therefore only one plastic mold is necessary for making the complete container of the two halves 10. The halves 10 include the four sides 17, 18, 19, and 21, and they also include the bottom 22 which is integral with the sides and extends through the halves to span and connect the sides. Thus each half forms a hollow interior for reception of at least a portion of the spectacles 11, whether it be the front portion with the lenses 13 or the spectacle portion with the temples 16. That is, in the final and mailing position shown in FIG. 1, the temples 16 would extend above the plane designated 23 of the four sides, and the temples 16 would therefore extend into the other half of the container and be enclosed therein. Thus the plane 23 is the parting plane between the two halves 10.

Tongues and grooves 24 and 26 are shown arranged on the side 18 and they are snugly matable when the two halves 10 are brought into the position shown in FIG. 4. Likewise, a tongue 27 and a groove 28 are arranged on the sides 17 and 19, respectively, for snug mating when the halves are brought together. Finally, tongue 29 and groove 31 are also mated together when the halves are brought together. Thus the tongues and grooves described are arranged on the halves so that the two halves can be snugly brought together along their parting plane 23, and the halves cannot move in any direction along the plane 23 since the tongues and grooves will prevent such movement.

The half 10 also has a nose piece 32 which is shown extending from the side 18 and into the hollow interior of the half 10 to at least the center line extending across the half 10 through its longer dimension. The nose piece 32 therefore extends from the bottom 22 and up to the parting plane 23 to be level with the plane 23 and thereby provide a reinforcing column through the center of the container when the two halves 10 are in the closed position of FIG. 4. Also, the nose piece 32 has its opposite sides 33 converging toward the center of the halves 10 and such convergence or wedge shape of the nose piece 32 permits accommodation of spectacles of different widths of nose bridge 14. That is, the nose piece 32 accommodates spectacles of all sizes of nose bridge. Also, the entire enclosed container consisting of the two halves 10 accommodates spectacles of all sizes, though only one size of container half 10 is required. Nevertheless, the spectacles 11 are prevented from sliding within the container to damage the spectacles when they are being transported in the container.

FIG. 2 shows the container half 10 to be slightly different from that shown in FIG. 1 in that the tongue and groove portions of the container have ribs or webs 34 which extend through the full height of the three sides 18, 19, and 21 and with the webs extending adjacent the grooves 26, 28, and 31. Therefore, the three tongues 24, 27, and 29 do not extend for the thickness of their respective sides in the halves 10 but instead they are slightly narrower than the sides and therefore accommodate the webs 34. This arrangement provides for additional sealing of the container from outside elements.

FIG. 4 therefore shows the two halves 10 in the closed position, and an adhesive tape 36 is shown wrapped around the container adjacent the parting plane 23, but obviously a sealing and securing strip could also be wrapped round the other direction of the container. FIG. 4 also shows a mailing sticker or label 37 affixed to the container, and this label could be typed and then applied to the container in any convenient manner.

It will therefore be understood that the two halves 10 present a hollow interior when they are placed together so that the interior has one half receiving the spectacle eye pieces 12, and the other half can receive the spectacle temples 16. The hollow interior as shown in FIG. 2 is such that the spectacles are snug within the interior and the nose piece 32 precludes any damaging sliding of the spectacles in the container. Also, the nose pieces 32 between the two halves 10 overlie and align with each other and are in abutting contact when the halves are closed so that the nose pieces 32 provide complete support for the spectacle bridge 14 and the pieces 32 also provide structural or reinforcing support for the container through its otherwise weakest portion, that is at the center of the container.

FIG. 5 shows a slightly different container half 38, and this half is different in that it has the tongues and grooves in a different arrangement from that shown in FIG. 2. Therefore, a groove 39 is on the wall 41 on the left in FIG. 5, and a tongue 42 is on the wall 43 on the right in FIG. 5. The other tongues and grooves in FIG. 5 are also opposite from those shown in the arrangement in FIG. 2.

FIG. 6 shows an insert 44 which has four sides 46, 47, 48, and 49 in a rectilinear arrangement to provide an enclosure or hollow interior 51. Also, the insert 44 has a partition 52 extending throughout the insert and between all of the four sides. A nose piece 53 extends from the side 46 and to the center of the insert 44, and it also extends from the partition 52 up to the plane designated 54. Finally, the insert 44 has tongues 56 and grooves 57 arranged around the four sides and on both upper and lower edges of the four sides, as shown in FIG. 6. The entire arrangement of the insert 44, and particularly of its tongues 56 and grooves 57, is such that the insert 44 mates with the container half 38 shown in FIG. 5. It will also be understood that the insert partition 52 extends across a central plane of the insert 44 so that two hollow interiors 51 are provided in the insert 44. This means that two nose pieces 53 also extend away from the partition 52 on the opposite faces of the partition 52, and these nose pieces 53 abut with the respective nose pieces 32 of the two halves 38 which may exist above and below the insert 44. Therefore, with the insert 44, a multiple spectacle mailer is provided so that two pairs of spectacles can be mailed in one container.

The arrangement with the insert 44 is such that the two nose pieces 32 and the two nose pieces 53 present a column for reinforcing the central portion of the closed and assembled container. Thus the insert 44 as seen in FIG. 6 may be described as showing the upper half of the insert 44, and it should be understood that the partition 52 extends through the horizontal center plane of the insert 44 and that the lower half is identical to the shown upper half.

Of course it will also be understood that the container half 38 can be used without the insert 44 in that two halves 38 can be mated together just as the two halves 10 are mated together in FIG. 4, and FIG. 5 is simply showing a variation of the arrangement of the tongues and grooves, from that shown in FIG. 2, and also from the arrangement shown in FIG. 1.

What is claimed is:

1. In a mailable container for spectacles of the binocular type including two eye pieces and an interconnecting nose bridge and two temple pieces pivotally connected to the eye pieces for overlying the eye pieces in the pivotally folded position of said temple pieces, said container including two rectilinear halves separably joined together along a parting plane therebetween and each having four sides and a bottom wall and a hollow interior extending from said parting plane to said bottom wall for the reception of said spectacles, a nose piece in said container and extending into said hollow interior to project adjacent said nose bridge to restrain movement of said spectacles in said container, the improvement comprising said halves being completely identical and with each including mating tongues and grooves on said four sides, said tongues and grooves being snugly mated together on each of said four sides and extending away from said parting plane for precluding relative movement between said halves along said parting plane, and said nose piece on each of said halves extending from each said bottom wall and into said hollow interior and terminating in planar surfaces extending along said parting plane and with said planar surfaces being in overlying face-to-face abutment with each other for strengthening said container against crushing said bottom walls toward each other.

2. The subject matter of claim 1, wherein said nose piece is offset from the center of said hollow interior of said halves, and said tongues and grooves are arranged on said halves relative to said nose piece to require that said nose pieces be in their overlying abutment orientation for all said tongues and grooves to mate.

3. The subject matter of claim 1, wherein said nose piece extends centrally along one of said four sides and is of a diminishing wedge-shape in its extent from said one side for presenting a projection to accommodate different widths of the spectacles' nose bridge.

4. The subject matter of claim 3, wherein said nose piece extends from said one side in its wedge shape and to at least the center plane through said container and parallel to said one side.

5. The subject matter of claim 1, including an insert disposed between said halves and including tongues and grooves on opposite faces for mating with said tongues and grooves of said halves, and a partition on said insert across the central plane thereof and forming an enclosure with both hollow interiors of said halves for receiving spectacles in each of said enclosures.

6. The subject matter of claim 5, including a nose piece extending along each face of said partition for overlying with the respective said nose pieces on said halves.

7. The subject matter of claim 6, wherein said nose pieces on said halves and said insert art all in stacked alignment and present a column across the center of said container for reinforcing said container.

References Cited

UNITED STATES PATENTS 1,886,189  11/1932  Lemfant _____ 220—4

FOREIGN PATENTS 1,199,687  8/1965  Germany.
571,430  1/1958  Italy.
1,027,889  4/1966  Great Britain.

JOSEPH R. LECLAIR, Primary Examiner

J. M. CASKIE, Assistant Examiner

U.S. Cl. X.R.

220—4